United States Patent
Webers

(10) Patent No.: US 7,472,003 B2
(45) Date of Patent: Dec. 30, 2008

(54) METHOD FOR THE OPERATION OF A SINGLE-AXLE ROLL STABILIZATION SYSTEM OF A TWO-AXLE, DOUBLE-TRACK VEHICLE

(75) Inventor: Klaus Webers, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/943,121

(22) Filed: Nov. 20, 2007

(65) Prior Publication Data
US 2008/0073864 A1 Mar. 27, 2008

Related U.S. Application Data

(63) Continuation of application No. PCT/EP2006/007195, filed on Jul. 21, 2006.

(30) Foreign Application Priority Data
Aug. 9, 2005 (DE) ........................ 10 2005 037 478

(51) Int. Cl.
*G06F 7/00* (2006.01)
(52) U.S. Cl. .......................... 701/38; 701/36
(58) Field of Classification Search ............. 701/36–41, 701/70–83; 180/197
See application file for complete search history.

(56) References Cited

U.S. PATENT DOCUMENTS

| 6,354,607 | B1 | 3/2002 | Kawashima et al. | |
| 6,654,674 | B2 * | 11/2003 | Lu et al. | ........................ 701/36 |
| 6,904,350 | B2 * | 6/2005 | Lu et al. | ........................ 701/70 |
| 2002/0013645 | A1 | 1/2002 | Badenoch | |

FOREIGN PATENT DOCUMENTS

| DE | 26 30 698 A1 | 1/1978 |
| DE | 43 27 220 A1 | 3/1994 |
| DE | 199 40 420 A1 | 3/2000 |
| DE | 102 15 465 A1 | 10/2003 |

(Continued)

OTHER PUBLICATIONS

International Search Report dated Sep. 28, 2006 (Six (6) pages).
German Search Report dated Jun. 13, 2006 (Nine (9) pages).

*Primary Examiner*—Richard M. Camby
(74) *Attorney, Agent, or Firm*—Crowell & Moring LLP

(57) ABSTRACT

An operating method for a single-axle roll stabilization system between the chassis and the body of a two-axle, double-track vehicle is provided, whereby energy for supporting a roll torque of the body may be introduced into the chassis via a controllable actuator, and the introduced stabilizing torque is represented as the product of a rigidity parameter and the roll angle or an alternative roll angle which corresponds to the roll angle with sufficient accuracy and is derived from a measurable variable, the rigidity parameter being freely selectable or adaptable in driving mode, depending on the travel speed of the vehicle. When the actuator is provided on the rear axle of the vehicle, the rigidity parameter, starting from a higher value, drops to lower values in a substantially monotonic manner with increasing travel speed, whereas the opposite applies for a front axle actuator.

20 Claims, 1 Drawing Sheet

FOREIGN PATENT DOCUMENTS

| | | |
|---|---|---|
| DE | 10 2004 035 578 A1 | 2/2006 |
| EP | 0 827 852 B1 | 3/1998 |
| EP | 0 829 383 A2 | 3/1998 |
| EP | 1 232 884 A2 | 8/2002 |
| EP | 1 564 042 B1 | 8/2005 |
| GB | 2 342 078 A | 4/2000 |
| JP | 4-135909 A | 5/1992 |
| JP | 4-169310 A | 6/1992 |

* cited by examiner

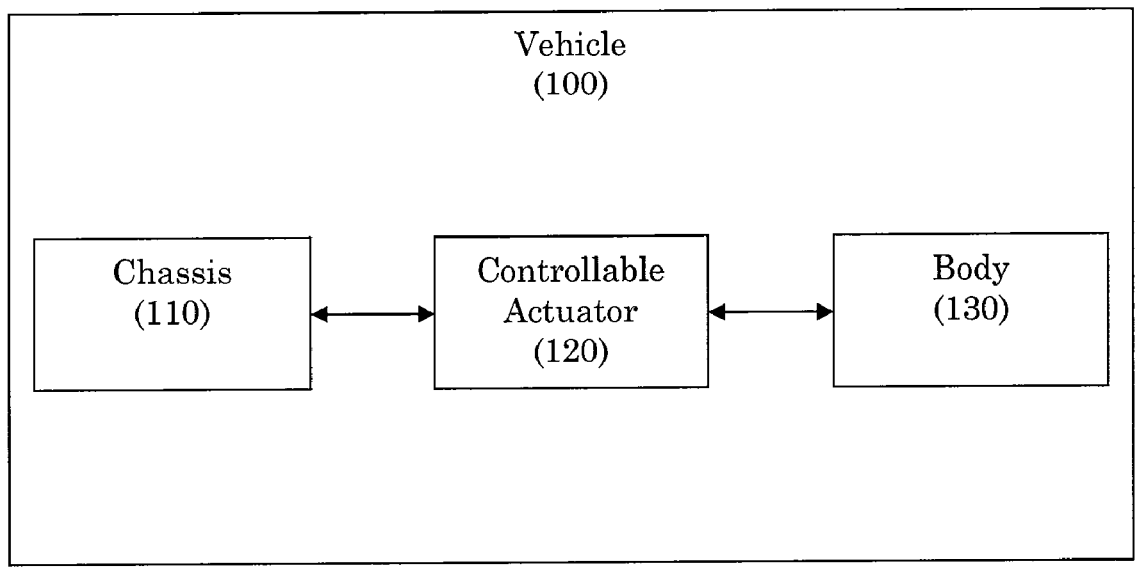

METHOD FOR THE OPERATION OF A SINGLE-AXLE ROLL STABILIZATION SYSTEM OF A TWO-AXLE, DOUBLE-TRACK VEHICLE

CROSS REFERENCE TO RELATED APPLICATIONS

This application is a continuation of PCT International Application No. PCT/EP2006/007195, filed Jul. 21, 2006, which claims priority under 35 U.S.C. § 119 to German Patent Application No. 10 2005 037 478.6 filed Aug. 9, 2005, the entire disclosures of which are herein expressly incorporated by reference.

BACKGROUND AND SUMMARY OF THE INVENTION

The present invention relates to an operating method for a single-axle roll stabilization system between the chassis and the body of a two-axle, double-track vehicle, whereby energy for supporting a roll torque of the body may be introduced into the chassis via a controllable actuator.

It is known that various external forces and torques act on the mass of a vehicle body which result in, among other things, a "roll motion," i.e., a rotational motion of the vehicle body about its longitudinal axis. The external forces are generated essentially by the action of centrifugal force during cornering, characterized by the instantaneous transverse acceleration, and by traveling over asymmetrical, uneven areas of a roadway. The resulting roll torque must ultimately be supported at the wheel contact point between the wheel and the roadway. For the necessary transmission of forces between the vehicle body and the wheel, according to the prior art spring/damper units are provided which are usually supplemented by stabilizers for transmission of the pure roll torques. Stabilizers are typically designed as transversely situated torsion bars rotatably supported on the vehicle body between the wheels of an axle. A transverse stabilizer may be used on the front axle and/or the rear axle. For the most part, spring/damper units as well as stabilizers are designed as passive elements, i.e., without supplying external control power.

Also characterized as prior art are devices for "active roll stabilization," by means of which roll torques are supported by supplying external power. With regard to the design, essentially a distinction is made between active spring/damper systems and active stabilizers. Particular designs may provide active elements on the front axle and rear axle (two-axle active systems), or may provide active elements on one axle and strictly passive elements on the other axle (single-axle active systems). A significant advantage of the single-axle system is the relative cost benefit compared to the more complex two-axle roll stabilization systems.

In principle, roll stabilization systems are used in order to keep the comfort-determining roll angle of the vehicle body as small as possible (or eliminate it entirely) during cornering, and at the same time, by means of a suitable distribution of the overall roll torque to be supported on the front and rear axles, to achieve a suitable yaw or roll steering effect of the vehicle. Use is made of the fact that a relatively stronger support on an axle, due to the associated increase in the transfer of normal force from the inner wheel to the outer wheel on this axle in conjunction with the degressive tire transverse force characteristic, results in a (relative) reduction of the lateral traction forces on the respective other axle. Thus, a stronger relative support on the front axle results in a stronger understeering response, in contrast to a relatively stronger support on the rear axle, which results in a tendency for an oversteering response.

For strictly passive roll stabilization, complete roll compensation is not possible on account of the finite roll rigidity. Thus, for stationary cornering a roll angle >0° in the direction of the outside of the curve always results, the value of which can only be minimized as the sum of the roll rigidity on the front and rear axles increases. As a result, the roll rigidity cannot be arbitrarily increased due to the conflict of objectives for the roll reaction on asymmetrical, uneven roadways. In addition, for strictly passive roll stabilization the ratio of the roll rigidity of the front axle to that of the rear axle is fixed by the design, so that the ratio of the supported roll torques during cornering, and therefore the roll steering tendency of the vehicle as well, is also fixed.

In contrast, two-axle, active roll stabilization systems offer the possibility of complete roll compensation since resettable torques may be applied not as a reaction to a finite stabilizer torsion, but instead, without any external torsion due to the external introduction of energy. When the torques on the front axle and rear axle are independently controlled, these systems also allow a roll steering effect to be set at will over wide ranges and adapted depending on the situation. However, the high complexity of the system and the associated high system costs are disadvantageous.

Single-axle, active roll stabilization systems likewise provide the possibility, at lower system costs, for optional design of the roll angle during cornering, all the way to full compensation. However, the unavoidable coupling of the roll steering effect to the choice of the particular active roll stabilization torque is disadvantageous. In particular for the target objective of reducing the roll angle for front axle-active systems, an increasingly pronounced understeering response is produced with increasing transverse acceleration; i.e., the vehicle progressively loses responsiveness as the transverse acceleration increases. For the same target objective, corresponding rear axle-active systems result in an increasingly pronounced oversteering response with increasing transverse acceleration. Both response effects have a significant (negative) deviation from the essentially constant roll steering effect which is naturally established for a passive vehicle.

An object of the present invention is to provide a remedy for this described problem; i.e., in this case a single-axle roll stabilization system is considered, for which an improvement of the system or its control is to be provided.

This and other object and advantages are achieved by a method in accordance with the present invention, in which an actuator introduces a stabilizing torque which is opposed to the roll torque and which essentially is represented as the product of a rigidity parameter and the roll angle or an alternative roll angle which corresponds to the roll angle with sufficient accuracy and is derived from a measurable variable, the rigidity parameter being freely selectable or adaptable in driving mode.

Thus, it is proposed to control single-axle, active roll stabilization systems in such a way that for any situation, i.e., for increasing or decreasing transverse acceleration, a constant but selectable roll steering effect primarily results. In one exemplary embodiment, the particular choice of the determining torque distribution, and consequently also the entire roll stabilization potential, may be adaptively modified according to the driving situation.

BRIEF DESCRIPTION OF THE DRAWING

The figure illustrates a block diagram representation of an apparatus in accordance with the present invention.

DETAILED DESCRIPTION OF EXEMPLARY EMBODIMENTS

An apparatus for single-axle roll stabilization between a chassis 110 and a body 130 of a two-axle, double-track vehicle 100 is illustrated in the FIGURE. The apparatus includes a controllable actuator 120 that is configured to introduce into the chassis 110 a stabilizing torque that is opposed to a roll torque of the body 130. The stabilizing torque is a product of a rigidity parameter and either a roll angle or an alternative roll angle that is derived from a measurable variable. The rigidity parameter is freely selectable and/or freely adaptable in driving mode.

A more detailed explanation is provided, starting with a roll stabilization configuration with a "strictly passive axle" having only passive spring/damper elements and optionally a passive torsion bar stabilizer, in addition to an "active axle" having an active roll stabilization control element or actuator as well as optional passive roll stabilization elements acting in parallel. The further discussion is based on a divided transverse stabilizer having an oscillating motor for twisting the stabilizer halves against one another, but also correspondingly applies for other actuators, to be discussed briefly further below. The nomenclature used has the following meanings:

$\phi$=Roll angle

Strictly passive axle having index "1":

$M_1$=roll stabilization torque of the strictly passive axle $$c_{S,1} = \frac{M_1}{\varphi}$$

= Roll rigidity of the passive axle, including all roll-related linear spring rates Active axle having index "2":

$M_{2,p}$=Roll stabilization torque of the active axle applied by passive portions $M_A$=Active roll stabilization torque applied by the actuator $$c_{S,2} = \frac{M_{2,p}}{\varphi}$$

= Passive roll rigidity of the active axle, including all roll-related linear spring rates $$c_v = \frac{M_A}{\varphi} = \text{"virtual" roll rigidity of the active axle}$$

= "rigidity parameter"

It is proposed to control the actuator (or multiple actuators, as the case may be) of the single-axle, active roll stabilization system (for example, in the sense of a setpoint selection of a lower-level torque control loop) in such a way that torque $M_A$ is generated as a function of the roll angle $\phi$, where $$M_A = C_v \cdot \phi. \tag{1}$$

In this regard, $c_v$ is a parameter which in the sense of a "virtual" stabilizer rigidity may be arbitrarily selected or adapted during driving mode, referred to here as "rigidity parameter."

When the actuator torque is set according to (1), the roll steering-influencing ratio of the roll stabilization torques is given by:

$$\frac{M_1}{M_2} = \frac{c_{S,1} \cdot \varphi}{c_{S,2} \cdot \varphi + c_v \cdot \varphi} = \frac{c_{S,1}}{c_{S,2} + c_v},$$

which is independent of (i.e., constant with respect to) the roll angle.

As previously mentioned, the rigidity parameter $c_v$ is freely selectable, so that in practice it is possible to specify whether a preferred understeering or a preferred oversteering driving response is desired. However, automatic adaptation (or variation) in driving mode, which may be a function of the vehicle speed, with suitable characteristics is advantageous and reliable. For active torque transfer to the rear axle (i.e., when the actuator (or actuators) acts on the rear axle of the vehicle), $c_v$ should preferably drop from a high value in a monotonic manner as the speed increases, whereby the transfer of torque to the rear axle is progressively less at high travel speeds, with the desired result of an increasing tendency toward understeering of the vehicle. For active torque transfer to the front axle (i.e., when the actuator (or actuators) acts on the front axle of the vehicle), the opposite applies. In other words, the rigidity parameter, starting from a lower value, rises to higher values in a substantially monotonic manner with increasing travel speed.

Actuator control according to (1) first assumes that the roll angle $\phi$ is directly measurable. Alternatively, known estimation methods may be used for observing the vehicle state in order to provide the roll angle as a virtual measurement signal. Instead, an alternative angle may be derived from the transverse acceleration of the vehicle. This alternative implementation form is based on the use of the instantaneous transverse acceleration ay, which usually is directly measurable. The unknown roll angle is substituted by $$\varphi = \frac{a_y \cdot m \cdot h}{c_{S,2} + c_{S,1} + c_v},$$

where the vehicle parameter m stands for the vehicle body mass, and h stands for the distance of the center of gravity from the roll center. The actuator (setpoint) torque is given as:

$$M_A = \frac{c_v \cdot m \cdot h}{c_{S,2} + c_{S,1} + c_v} \cdot a_y. \tag{2}$$

In this regard, $c_v$ may also be specified as an adaptive parameter with suitable characteristics, which likewise results in a constant torque ratio with respect to the transverse acceleration.

It is thus proposed to employ a single-axle active roll stabilization system in such a way that an actuator, for example an active stabilizer, is used to generate an active torque which corresponds to the torque buildup of a passive system or stabilizer, but for which the respective simulated stabilizer rigidity is adaptively modified to the driving situation, for example the instantaneous longitudinal velocity. A significant advantage is that the resulting roll steering effect of the single-axle system is consistent in any situation. That is, the distribution of the roll torques to be supported on the front and rear axles is independent of the increase or decrease in the roll angle (i.e., the transverse acceleration). As mentioned several times above, the actuator may be an oscillating motor in a divided transverse stabilizer for the chassis. Alternatively, the actuator may be formed by two control elements in the left and right wheel suspension of the vehicle, by means of which a base point displacement of the particular suspension spring or the like may be achieved.

Besides the previous discussion, in the calculation of the parameters for the passive stabilization elements, nonlinear effects may also be incorporated into the referenced regression equations, for example, in the form of nonlinear translation kinematics and/or progressively employed auxiliary springs as a function of (measured) level information. The (setpoint) actuator torques may also be supplemented by additive or multiplicative correction terms which result in a suitably higher or lower torque transfer to the active axle as a function of other indicators or optionally, critical under- or oversteering states. Such indicators could include, for example, a critical increase in the slip angle, or a deviation of the measured yaw rate from a predetermined setpoint yaw rate. It is emphasized that these and numerous other details may be designed differently from the above descriptions without departing from the content of the appended claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating method for a single-axle roll stabilization system between a chassis and a body of a two-axle, double-track vehicle, whereby energy for supporting a roll torque of the body is introduced into the chassis via a controllable actuator,
   wherein the actuator introduces a stabilizing torque which is opposed to the roll torque and which is substantially represented as a product of a rigidity parameter and either a roll angle or an alternative roll angle, which corresponds to the roll angle with sufficient accuracy, that is derived from a measurable variable, the rigidity parameter being freely selectable or adaptable in driving mode.

2. The operating method according to claim 1, wherein the rigidity parameter is a function of the travel speed of the vehicle.

3. The operating method according to claim 2, wherein the actuator is provided on the rear axle of the vehicle, and the rigidity parameter, starting from a higher value, drops to lower values in a substantially monotonic manner with increasing travel speed.

4. The operating method according to claim 2, wherein the actuator is provided on the front axle of the vehicle, and the rigidity parameter, starting from a lower value, rises to higher values in a substantially monotonic manner with increasing travel speed.

5. The operating method according to claim 1, wherein the actuator is an oscillating motor in a divided transverse stabilizer for the chassis.

6. The operating method according to claim 1, wherein the actuator is formed by two control elements in the left and right wheel suspension of the vehicle for reaching a base point displacement of a particular suspension spring.

7. The operating method according to claim 1, wherein the alternative roll angle is derived from the transverse acceleration of the vehicle.

8. The operating method according to claim 1, wherein, in a calculation of parameters of passive chassis stabilization elements performed to determine an actuator stabilization torque, nonlinear effects of said parameters may be incorporated.

9. The operating method according to claim 8, wherein, in the determination of the actuator stabilization torque, at least one additive or multiplicative correction term for taking into account a critical vehicle state is included.

10. A method for operating a single-axle roll stabilization system between a chassis and a body of a two-axle, double-track vehicle, whereby energy for supporting a roll torque of the body is introduced into the chassis via a controllable actuator, the method comprising the act of:
    introducing into the chassis, via the controllable actuator, a stabilizing torque that is opposed to the roll torque,
    wherein the stabilizing torque is a product of a rigidity parameter and either a roll angle or an alternative roll angle that is derived from a measurable variable, and
    wherein the rigidity parameter is at least one of freely selectable and freely adaptable in driving mode.

11. The operating method according to claim 10, wherein the rigidity parameter is a function of the travel speed of the vehicle.

12. The operating method according to claim 11, wherein the actuator is provided on the rear axle of the vehicle, and the rigidity parameter, starting from a higher value, drops to lower values in a substantially monotonic manner with increasing travel speed.

13. The operating method according to claim 11, wherein the actuator is provided on the front axle of the vehicle, and the rigidity parameter, starting from a lower value, rises to higher values in a substantially monotonic manner with increasing travel speed.

14. The operating method according to claim 10, wherein the actuator is an oscillating motor in a divided transverse stabilizer for the chassis.

15. The operating method according to claim 10, wherein the actuator is formed by two control elements in the left and right wheel suspension of the vehicle for reaching a base point displacement of a particular suspension spring.

16. The operating method according to claim 10, wherein the alternative roll angle is derived from the transverse acceleration of the vehicle.

17. The operating method according to claim 10, wherein, in a calculation of parameters of passive chassis stabilization elements performed to determine an actuator stabilization torque, nonlinear effects of said parameters may be incorporated.

18. The operating method according to claim 17, wherein, in the determination of the actuator stabilization torque, at least one additive or multiplicative correction term for taking into account a critical vehicle state is included.

19. An apparatus for single-axle roll stabilization between a chassis and a body of a two-axle, double-track vehicle, comprising:
    a controllable actuator configured to introduce into the chassis a stabilizing torque that is opposed to a roll torque of the body,
    wherein the stabilizing torque is a product of a rigidity parameter and either a roll angle or an alternative roll angle that is derived from a measurable variable, and
    wherein the rigidity parameter is at least one of freely selectable and freely adaptable in driving mode.

20. The apparatus of claim 19, wherein the actuator is an oscillating motor in a divided transverse stabilizer for the chassis.

* * * * *